United States Patent
Verma et al.

(10) Patent No.: US 8,527,935 B1
(45) Date of Patent: Sep. 3, 2013

(54) SYSTEM FOR REDUCING POWER CONSUMPTION OF ELECTRONIC CIRCUIT

(71) Applicants: Chetan Verma, Noida (IN); Amit Roy, Greater Noida (IN); Vijay Tayal, Jodhpur (IN)

(72) Inventors: Chetan Verma, Noida (IN); Amit Roy, Greater Noida (IN); Vijay Tayal, Jodhpur (IN)

(73) Assignee: Freescale Semiconductor, Inc, Austin, TX (US)

( * ) Notice: Subject to any disclaimer, the term of this patent is extended or adjusted under 35 U.S.C. 154(b) by 0 days.

(21) Appl. No.: 13/735,049

(22) Filed: Jan. 7, 2013

(51) Int. Cl.
  *G06F 17/50* (2006.01)
(52) U.S. Cl.
  USPC ............................................. 716/133
(58) Field of Classification Search
  USPC .......................................... 716/133
  See application file for complete search history.

(56) References Cited

U.S. PATENT DOCUMENTS

| | | | |
|---|---|---|---|
| 4,698,760 A | 10/1987 | Lembach et al. | |
| 4,827,428 A | 5/1989 | Dunlop et al. | |
| 5,179,298 A | 1/1993 | Hirano et al. | |
| 5,612,636 A * | 3/1997 | Ko | 326/83 |
| 6,397,170 B1 * | 5/2002 | Dean et al. | 703/14 |

* cited by examiner

*Primary Examiner* — Vuthe Siek
*Assistant Examiner* — Aric Lin
(74) *Attorney, Agent, or Firm* — Charles Bergere

(57) ABSTRACT

A method and system for reducing power consumption of an electronic circuit design using an EDA tool includes generating a look-up table (LUT) that stores a mapping between a type, a predetermined optimum power input transition time, and at least one characteristic corresponding to each digital logic element present in a cell library of the EDA tool. An input transition time of a first digital logic element is determined. Then, the first logic element is replaced with a second logic element if the input transition time and the predetermined optimum power input transition time of the first logic element are not equal. The second logic element may be replaced with a third logic element if a timing delay of the second logic element is greater than a timing delay of the first logic element.

16 Claims, 4 Drawing Sheets

SYSTEM FOR REDUCING POWER CONSUMPTION OF ELECTRONIC CIRCUIT

BACKGROUND OF THE INVENTION

The present invention relates generally to electronic circuits, and, more specifically to reducing power consumption of electronic circuits.

Electronic circuits are designed using digital logic elements including logic gates and combinational logic circuits. The digital logic elements include complementary metal-oxide semiconductor (CMOS) circuits. CMOS circuits consume power, which leads to high power dissipation and increases junction temperatures of the electronic circuits. Power dissipation is also a concern, especially for low power circuits that run on batteries because excessive power consumption reduces battery charge more quickly.

Power is usually dissipated from a circuit in the form of dynamic power and is classified as one of two types: switching power and short circuit power. Switching power is dissipated by CMOS circuits by charging and discharging various load capacitances (gate/wire/source/drain capacitances) of the transistors while switching and short circuit power is dissipated when both transistors (p-type and n-type) of a CMOS circuit remain switched ON for a short intermediate time period during transistor state changes. During this intermediate time period, current flows from supply to ground and leads to dissipation of short circuit power.

Reducing power consumption requires reducing power dissipation caused by both switching and short circuit powers. Existing techniques such as power gating and clock gating reduce power dissipation by shutting off the supply of power to digital logic elements and to clock generation and distribution circuits. However, multiple parallel applications and architectural limitations restrict the number of logic elements and clock generation and distribution circuits that can be shut down. Continuous power is therefore required by most of the logic elements.

Other conventional methods for reducing power consumption alter specific characteristics of the digital logic elements. For example, one method optimizes timing delays of the logic elements to reduce power dissipation. Another method minimizes the power dissipation based on a minimum summation of the short circuit power by altering drive strengths of digital logic elements and checking timing degradation of the entire circuit. The process of checking timing degradation is repeated for each logic element of the circuit. Yet another method alters sizes of the logic elements to reduce power dissipation. All of the above-mentioned methods alter a characteristic of a logic element and deteriorate the performance of the electronic circuit.

Therefore, it would be advantageous to have a system that reduces power consumption without impacting performance, and that overcomes the above-mentioned limitations of the conventional power reduction methods.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF THE INVENTION

Figure 1:
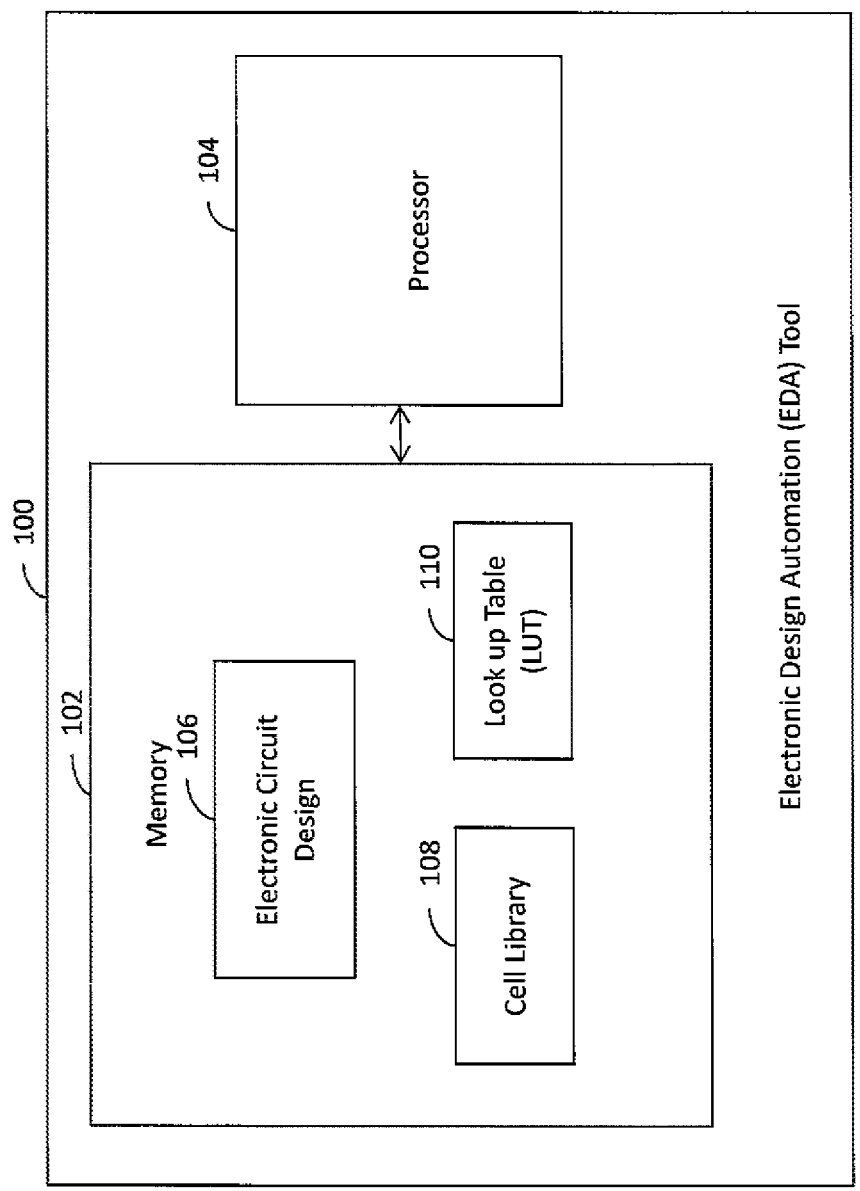
FIG. 1 is a schematic block diagram of an electronic design automation (EDA) tool for reducing power consumption of an electronic circuit design in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a method for reducing power consumption and timing delay of an electronic circuit design using an electronic design automation (EDA) tool is provided. The electronic circuit design is stored in a memory of the EDA tool and includes a plurality of digital logic elements. A look-up table (LUT) is provided that stores a mapping between a type, a predetermined optimum power input transition time, and at least one characteristic of each digital logic element in a cell library. The predetermined optimum power input transition time of a digital logic element corresponds to a lowest sum of a switching power and a short circuit power of the digital logic element. An input transition time of a first digital logic element is determined and compared with the predetermined optimum power input transition time of the first digital logic element. The first digital logic element is replaced with a second digital logic element, by referring to the LUT, when the input transition time of the first digital logic element is not equal to the predetermined optimum power input transition time of the first digital logic element. The second digital logic element has a predetermined optimum power input transition time equal to the input transition time of the first digital logic element. First and second timing delays corresponding to the first and second digital logic elements respectively are determined. The second digital logic element is replaced with a third digital logic element when the second timing delay is greater than the first timing delay. The third digital logic element has a predetermined optimum power input transition time substantially equal to the input transition time of the first digital logic element.

Various embodiments of the present invention provide a system and method for reducing power consumption of an electronic circuit design using an EDA tool. The EDA tool replaces a first digital logic element of the electronic circuit design with a second digital logic element from a cell library of the EDA tool when the input transition time of the first digital logic element is not equal to the predetermined optimum power input transition time of the first digital logic element. The second digital logic element has a predetermined optimum power input transition time equal to the input transition time of the first digital logic element and has same characteristics as that of the first digital logic element. The EDA tool repeats the method for each digital logic element. The EDA tool also reduces the timing delay of the digital logic elements to improve the performance of the electronic circuit. As opposed to conventional power optimization techniques that alter characteristics of the digital logic elements, the EDA tool of the present invention replaces digital logic elements based on their input transition times and reduces the timing delays and ensures that the performance of the electronic circuit is not degraded. Further, the optimum power input transition times are predetermined and stored in a LUT that can be readily referred to during the design phase.

When the electronic circuit design is implemented in silicon, the switching and short circuit powers dissipated by the digital logic elements, i.e., the dynamic power consumption of the circuit is significantly reduced, which reduces or eliminates the need for clock and power gating to shut down the power supplied to the electronic circuit. Reduction in power consumption further reduces junction temperatures of the electronic circuit.

Referring now to FIG. 1, a schematic block diagram illustrating an electronic design automation (EDA) tool 100 for reducing power consumption of an electronic circuit design 106 in accordance with an embodiment of the present invention is shown. The EDA tool 100 includes a memory 102 and a processor 104 in communication with the memory 102. The memory 102 receives and stores the electronic circuit design 106 and a cell library 108. The cell library 108 contains instances of all digital logic elements that are part of the electronic circuit design 106. The memory 102 and processor 104 comprise a computer system that can range from a stand-alone personal computer to a network of processors and memories, to a mainframe system. Examples of the EDA tool 100 include Cadence® Encounter™ digital IC design platform, Integrated Circuit Compiler (ICC) by Synopsys, Inc., and Olympus SoC by Mentor Graphics, Inc. Such tools and computer systems are known to those of skill in the art. Examples of the electronic circuit design 106 include microprocessor, microcontroller unit (MCU), system-on-chip (SoC), and application specific integrated circuit (ASIC) designs. The electronic circuit design 106 includes a plurality of digital logic elements (not shown).

In an embodiment of the present invention, the processor 104 determines optimum power input transition times for each digital logic element in the cell library 108 based on switching and short circuit power values that are input to the EDA tool 100. The processor 104 generates a look-up table (LUT) 110 that stores a mapping between a type, a predetermined optimum power input transition time and at least one characteristic corresponding to each digital logic element. The characteristic includes an output load, a size, a sum of switching and short circuit powers and a strength of each digital logic element. The type of logic element includes, for example, AND, OR, NOT, NOR, NAND, XOR, and XNOR gates, and combinational logic circuits. The output load is a static load corresponding to resistance and capacitance offered by interconnecting wires and an input gate capacitance of a subsequent digital logic element that is to be driven. The strength of a digital logic element refers to the number of digital logic elements that it can drive at its output (measured in unit output load). Table A illustrates an example of entries of the LUT 110:

TABLE A

Example of the LUT 110

| Digital Logic Element | Type | Strength (unit output load) | Predetermined optimum power input transition time (nanoseconds, ns) | Size (nanometer, nm) | Output load (Pico farad, pF) | Sum of Short Circuit and Switching powers (Pico Joules, PJ) |
|---|---|---|---|---|---|---|
| DLE1 | NAND | 30 | 0.0040 | 7 | 0.0149 | 0.0252 |
| DLE2 | NAND | 30 | 0.0051 | 7 | 0.015 | 0.0254 |
| DLE3 | NOR | 9 | 0.0051 | 5 | 0.0007 | 0.0011 |
| DLE4 | NAND | 30 | 0.0424 | 7 | 0.0149 | 0.0252 |

Figure 2:
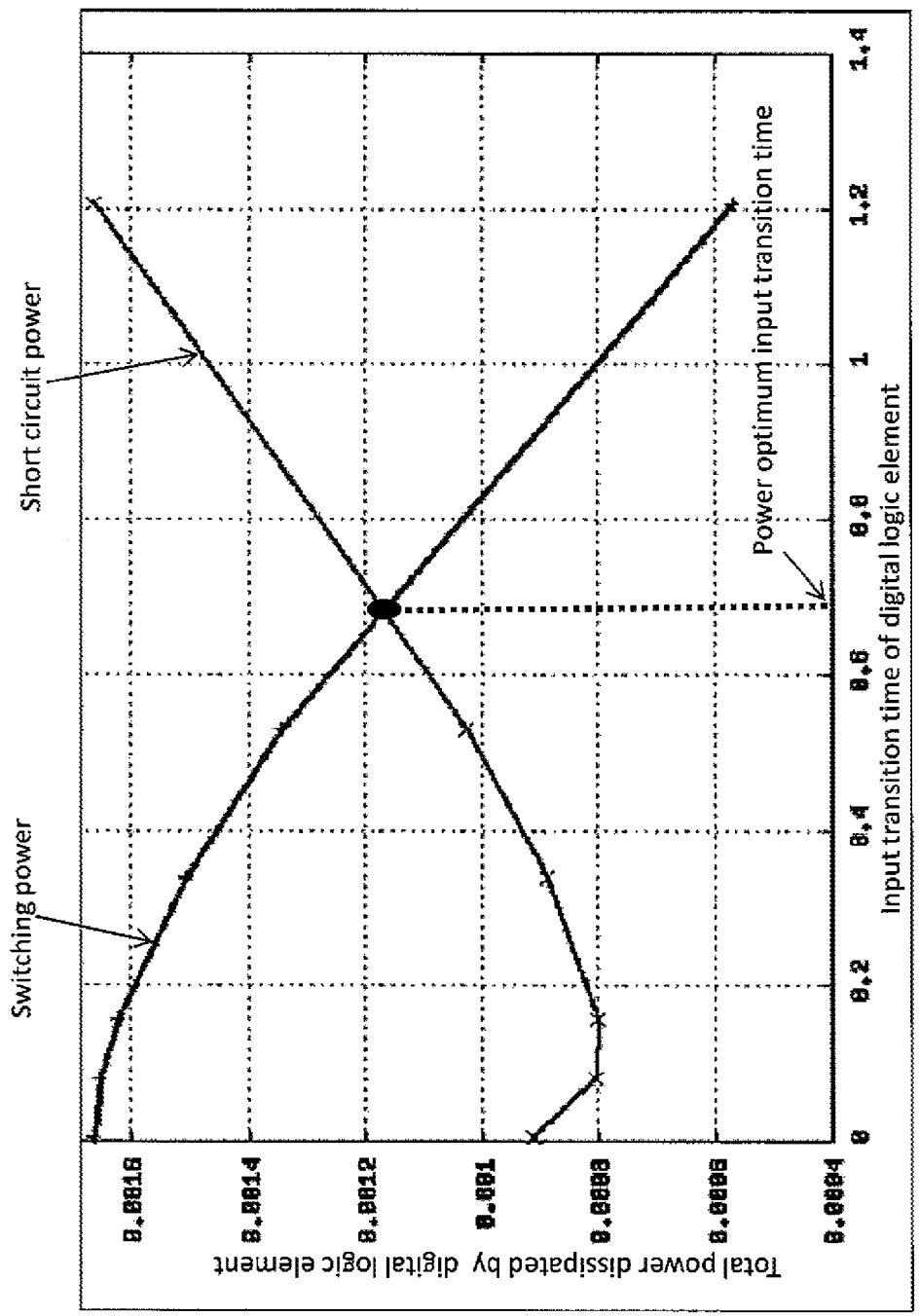
FIG. 2 is a graph depicting a relationship between an input transition time and total power dissipated by a digital logic element in accordance with an embodiment of the present invention.

The processor 104 determines an input transition time of a first digital logic element and compares the input transition time with a predetermined optimum power input transition time of the first digital logic element, by referring to the LUT 110. Input transition time of a digital logic element is the time taken by the digital logic element to switch state upon receiving an input. When the input transition time and the predetermined optimum power input transition time of a digital logic element are equal, the switching power and short circuit power dissipated by the digital logic element is the least. The input transition time at which the switching and short circuit power curves of the digital logic element intersect is the predetermined optimum power input transition time of the digital logic element, as illustrated by the graph in FIG. 2.

If the input transition time of the first digital logic element is not equal to the predetermined optimum power input transition time, the processor 104 searches the LUT 110 for a second digital logic element that has a type and a characteristic similar to that of the first digital logic element and that has a predetermined optimum power input transition time equal to the input transition time of the first digital logic element. Upon identifying, the processor 104 selects the second digital logic element from the cell library 108 and replaces the first digital logic element with the second digital logic element.

Upon replacing the first digital logic element with the second digital logic element, the processor 104 determines and compares first and second timing delays of the first and second digital logic elements, respectively. If the second timing delay is greater than the first timing delay, the processor 104 searches the LUT 110 for a third digital logic element that has a type and a characteristic similar to that of the first digital logic element and that has a predetermined optimum power input transition time substantially equal to the input transition time of the first digital logic element. Upon identifying, the processor 104 selects the third digital logic element from the cell library 108 and replaces the first digital logic element with the third digital logic element.

Certain chains of digital logic elements of the circuit design 106 do not have a crucial timing delay and a deviation in timing delay while reducing the power consumption is acceptable. In such an embodiment, a user can specify the allowable deviation in the timing delay. When such deviation is allowed, power consumption is further reduced by ensuring that each replaced digital logic element has a predetermined optimum power input transition time that is equal to the input transition time.

In an example, the processor 104 determines an input transition time of the first digital logic element (DLE1) as 0.051 nanoseconds, ns (see Table A). DLE1 is a NAND gate and has a size of 7 nanometers (nm). The predetermined optimum power input transition time of DLE1 is 0.0040 ns, which does not match the input transition time of DLE1. Hence, the processor 104 searches the LUT 110 for a second digital logic element that is a NAND gate, that has a size of 7 nm, and that has a predetermined optimum power input transition time equal to 0.051 ns. The second digital logic element is identified as DLE2. The processor 104 selects DLE2 from the cell library 108 and replaces DLE1 with DLE2 in the circuit design 106.

Thereafter, the processor 104 determines the timing delay of DLE1 (i.e., td1=2 ns) and DLE2 (i.e., td2=3 ns). Since td2 is greater than td1, the processor 104 searches the LUT 110 for a third digital logic element that is a NAND gate, that has a size of 7 nm, and that has a predetermined optimum power input transition time substantially equal to the input transition time of the DLE1. DLE4 has a predetermined optimum power input transition time of 0.0424 ns and is identified as the third digital logic element. The processor 104 picks DLE4 from the cell library 108 and updates the circuit design 106 by replacing DLE2 with DLE4. Also, the timing delay (td4=2 ns) of DLE4 is not greater than td1. Thus the timing delay of the electronic circuit design 106 is improved along with the power dissipation.

The process is repeated for all digital logic elements of the circuit design 106 to reduce the overall power consumption and total timing delay.

Figure 3:
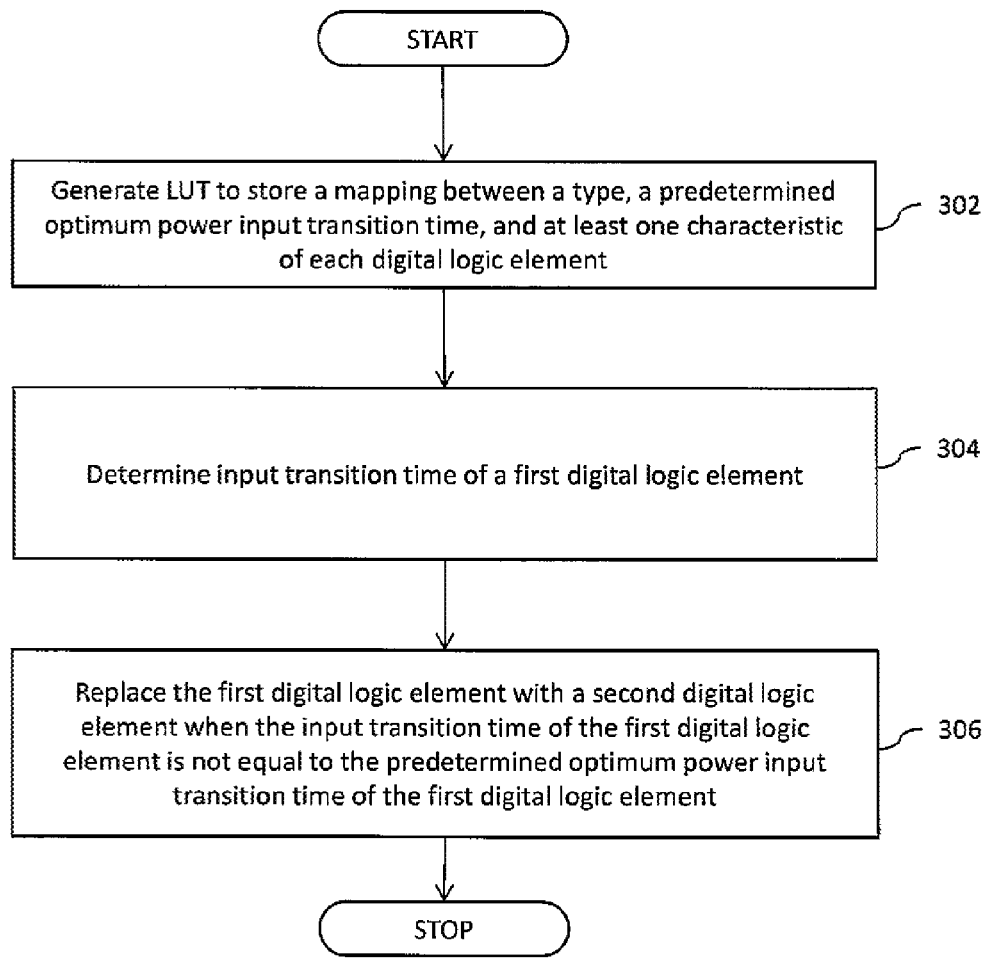
FIG. 3 is a flowchart depicting a method for reducing power consumption of an electronic circuit design in accordance with an embodiment of the present invention.

Referring now to FIG. 3, a flowchart depicting a method for reducing power consumption of an electronic circuit design in accordance with an embodiment of the present invention is shown. Steps in the flowchart of FIG. 3 have been explained in conjunction with FIG. 1.

The processor 104 identifies predetermined optimum power input transition times for each digital logic element of the electronic circuit design 106. At step 302, the processor 104 generates the LUT 110 for the digital logic elements in the cell library 108. The LUT 110 stores a mapping between a type, the predetermined optimum power input transition time and a characteristic corresponding to each digital logic element. At step 304, the processor 104 determines an input transition time of the first digital logic element and compares the input transition time with a predetermined optimum power input transition time of the first digital logic element, by referring to the LUT 110. At step 306, if the input transition time is not equal to the predetermined optimum power input transition time of the first digital logic element, the processor 104 updates the circuit design by replacing the first digital logic element with the second digital logic element. The second digital logic element has a predetermined optimum power input transition time equal to the input transition time of the first digital logic element. The processor 104 selects the second digital logic element by referring to the LUT 110 and matching a type and a characteristic of the second digital logic element with that of the first digital logic element.

Figure 4:
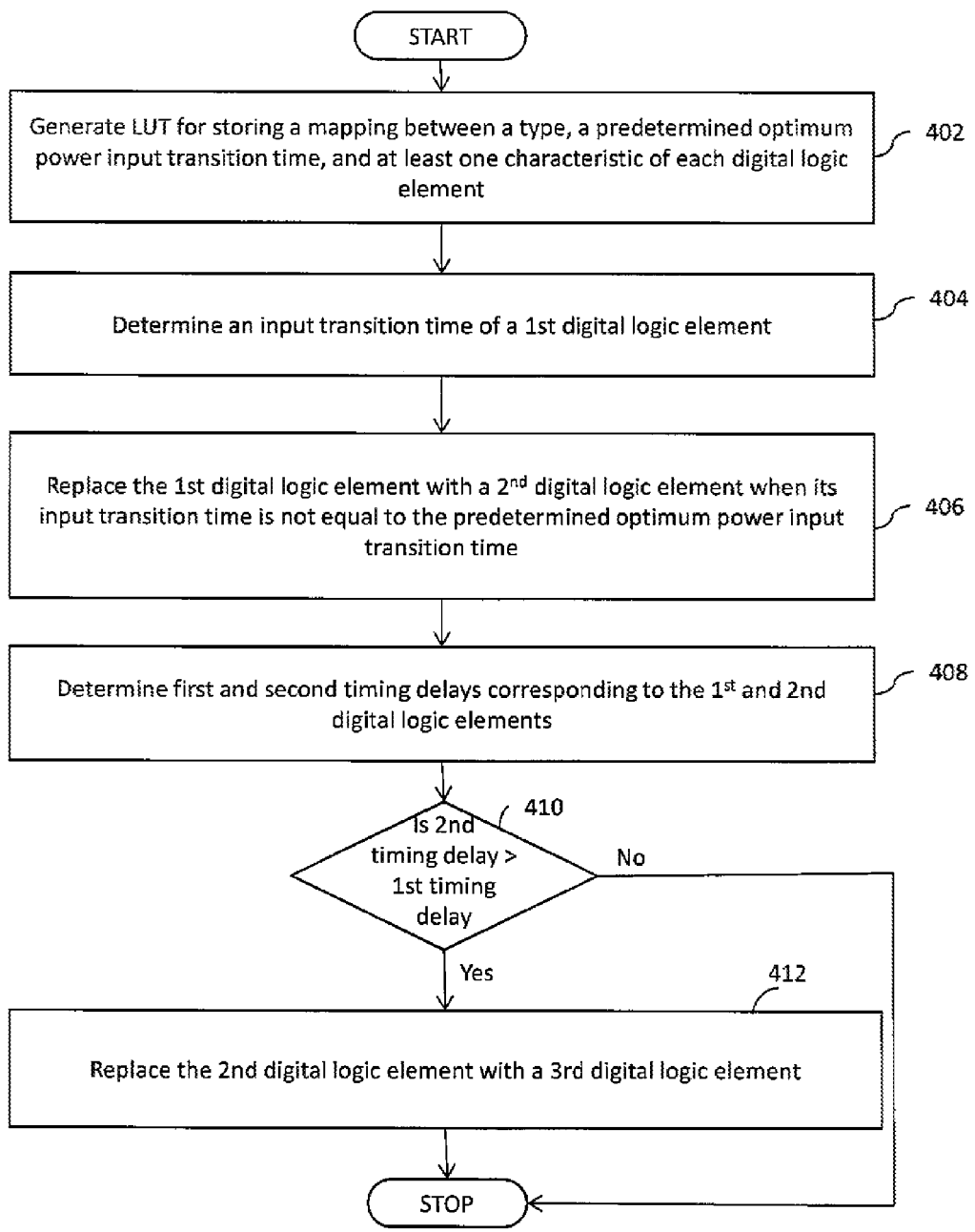
FIG. 4 is a flowchart depicting a method for reducing power consumption and timing delay in an electronic circuit design in accordance with an embodiment of the present invention.

Referring now to FIG. 4, a flowchart depicting a method for reducing power consumption and timing delay of an electronic circuit design in accordance with an embodiment of the present invention is shown.

At step 402, the processor 104 generates the LUT 110. At step 404, the processor 104 determines the input transition time of the first digital logic element. At step 406, if the input transition time of the first digital logic element is not equal to the predetermined optimum power input transition time of the first digital logic element, the processor 104 replaces the first digital logic element with the second digital logic element having a predetermined optimum power input transition time equal to the input transition time of the first digital logic element. Steps 402-406 are similar to steps 302-306 of FIG. 3.

At step 408, the processor 104 determines first and second timing delays of the first and second digital logic elements, respectively. At step 410, the processor 104 compares the second timing delay with the first timing delay. At step 410, if the second timing delay is not greater than the first timing delay, the process stops. If the second timing delay is greater than the first timing delay, at step 412, the processor 104 replaces the second digital logic element with the third digital logic element such that a predetermined optimum power input transition time of the third digital logic element is substantially equal to the input transition time of the first digital logic element and a timing delay of the third digital logic element is less than or equal to the first timing delay. Steps 402-412 are repeated for all digital logic elements of the electronic circuit design 106 to optimize the overall power consumption and total timing delay of the electronic circuit design 106.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. An electronic design automation (EDA) tool for reducing power consumption of an electronic circuit design, wherein the circuit design includes a plurality of digital logic elements, the EDA tool comprising:
   a memory used to store the electronic circuit design; and
   a processor, in communication with the memory, and configured to:
      generate a look-up table (LUT) for storing a mapping between a type, a predetermined optimum power input transition time and at least one characteristic of each digital logic element in a cell library, wherein the predetermined optimum power input transition time of a digital logic element corresponds to a lowest sum of a switching power and a short circuit power of the digital logic element, wherein at the predetermined optimum power input transition time, the switching power and short circuit power of the digital logic element are equal;
      identify an input transition time of a first digital logic element; and
      replace the first digital logic element with a second digital logic element when the input transition time of the first digital logic element is not equal to the predetermined optimum power input transition time of the first digital logic element, wherein the second digital logic element has a predetermined optimum power input transition time equal to the input transition time of the first digital logic element.

2. The EDA tool of claim 1, wherein the at least one characteristic includes an output load, a size, a strength and a sum of a switching power and a short circuit power of each digital logic element.

3. The EDA tool of claim 1, wherein the type of a digital logic element includes one of an AND gate, an OR gate, a NOT gate, a NOR gate, a NAND gate, an XOR gate, an XNOR gate, and a combinational logic circuit.

4. The EDA tool of claim 1, wherein the processor further determines first and second timing delays corresponding to the first and second digital logic elements.

5. The EDA tool of claim 4, wherein the processor further replaces the second digital logic element with a third digital logic element when the second timing delay is greater than the first timing delay, wherein the third digital logic element has a predetermined optimum power input transition time that is substantially equal to the input transition time of the first digital logic element.

6. The EDA tool of claim 5, wherein the second and third digital logic elements are selected, by matching a type and at least one characteristic of the second and third digital logic elements with a type and at least one characteristic of the first digital logic element, respectively.

7. A method for reducing power consumption of an electronic circuit design that includes a plurality of digital logic elements, using an electronic design automation (EDA) tool, wherein the EDA tool includes a memory that stores the electronic circuit design and a processor in communication with the memory, the method comprising:
  generating a look-up table (LUT) storing a mapping between a type, a predetermined optimum power input transition time, and at least one characteristic of each digital logic element in a cell library, wherein the predetermined optimum power input transition time of a digital logic element corresponds to a lowest sum of a switching power and a short circuit power of the digital logic element, wherein at the predetermined optimum power input transition time, the switching power and short circuit power of the digital logic element are equal;
  identifying an input transition time of a first digital logic element; and
  replacing the first digital logic element with a second digital logic element when the input transition time of the first digital logic element is not equal to the predetermined optimum power input transition time of the first digital logic element, wherein the second digital logic element has a predetermined optimum power input transition time equal to the input transition time of the first digital logic element.

8. The method of claim 7, wherein the at least one characteristic includes an output load, a size, a strength and a sum of a switching power and a short circuit power of each digital logic element.

9. The method of claim 7, wherein the type of a digital logic element includes one of an AND gate, an OR gate, a NOT gate, a NOR gate, a NAND gate, an XOR gate, an XNOR gate, and a combinational logic.

10. The method of claim 7, further comprising determining first and second timing delays corresponding to the first and second digital logic elements.

11. The method of claim 10, further comprising replacing the second digital logic element with a third digital logic element when the second timing delay is greater than the first timing delay, wherein the third digital logic element has a predetermined optimum power input transition time substantially equal to the input transition time of the first digital logic element.

12. The method of claim 11, wherein the second and third digital logic elements are selected, by matching a type and at least one characteristic of the second and third digital logic elements with a type and at least one characteristic of the first digital logic element, respectively.

13. A method for reducing power consumption of an electronic circuit design that includes a plurality of digital logic elements, using an electronic design automation (EDA) tool, wherein the EDA tool includes a memory that stores the electronic circuit design and a processor in communication with the memory, the method comprising:
  generating a look-up table (LUT) storing a mapping between a type, a predetermined optimum power input transition time and at least one characteristic of each digital logic element in a cell library, wherein the predetermined optimum power input transition time of a digital logic element corresponds to a lowest sum of a switching power and a short circuit power of the digital logic element, wherein at the predetermined optimum power input transition time, the switching power and short circuit power of the digital logic element are equal;
  identifying an input transition time of a first digital logic element;
  replacing the first digital logic element with a second digital logic element when the input transition time of the first digital logic element is not equal to the predetermined optimum power input transition time of the first digital logic element, wherein the second digital logic element has a predetermined optimum power input transition time equal to the input transition time of the first digital logic element;
  determining first and second timing delays corresponding to the first and second digital logic elements; and
  replacing the second digital logic element with a third digital logic element when the second timing delay is greater than the first timing delay, wherein the third digital logic element has a predetermined optimum power input transition time substantially equal to the input transition time of the first digital logic element.

14. The method of claim 13, wherein the at least one characteristic includes an output load, a size, a strength and a sum of a switching power and a short circuit power of each digital logic element.

15. The method of claim 13, wherein the type of a digital logic element includes one of an AND gate, an OR gate, a NOT gate, a NOR gate, a NAND gate, an XOR gate, an XNOR gate, and a combinational logic.

16. The method of claim 13, wherein the second and third digital logic elements are selected, by matching a type and at least one characteristic of the second and third digital logic elements with a type and at least one characteristic of the first digital logic element, respectively.

* * * * *